US007473302B2

(12) United States Patent
Ueda

(10) Patent No.: US 7,473,302 B2
(45) Date of Patent: Jan. 6, 2009

(54) LIQUID HOUSING CONTAINER AND LIQUID SUPPLY APPARATUS

(75) Inventor: Hikaru Ueda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 11/313,822

(22) Filed: Dec. 22, 2005

(65) Prior Publication Data

US 2006/0137526 A1 Jun. 29, 2006

(30) Foreign Application Priority Data

Dec. 28, 2004 (JP) ............................ 2004-381750

(51) Int. Cl.
*B01D 53/22* (2006.01)

(52) U.S. Cl. .......................... 96/6; 96/8; 96/10; 96/11; 96/12; 95/46; 95/47; 95/54; 210/640; 210/650; 210/500.23; 55/385.1; 55/385.4; 55/495; 55/528; 347/86; 347/87

(58) Field of Classification Search .................... 95/45, 95/47, 54, 46; 96/4, 6, 8, 10, 11, 12; 210/640, 210/641, 650, 500.23; 347/85, 86, 87; 55/385.1, 55/385.4, 495, 527, 528
See application file for complete search history.

(56) References Cited

U.S. PATENT DOCUMENTS

| | | | | |
|---|---|---|---|---|
| 3,953,862 | A * | 4/1976 | Amberntsson et al. | 347/87 |
| 4,419,677 | A | 12/1983 | Kasugayama et al. | 347/87 |
| 4,571,599 | A * | 2/1986 | Rezanka | 347/87 |
| 5,555,238 | A * | 9/1996 | Miyazawa | 347/86 |
| 5,888,275 | A * | 3/1999 | Hamasaki et al. | 96/6 |
| 6,196,668 | B1 * | 3/2001 | Bode | 347/85 |
| 6,379,796 | B1 * | 4/2002 | Uenishi et al. | 428/398 |
| 6,432,179 | B1 * | 8/2002 | Lobovsky et al. | 55/527 |
| 6,447,679 | B1 * | 9/2002 | Watari et al. | 96/6 |
| 6,517,725 | B2 * | 2/2003 | Spearman et al. | 210/640 |
| 6,558,450 | B2 * | 5/2003 | Sengupta et al. | 95/46 |
| 6,648,945 | B1 * | 11/2003 | Takeda et al. | 95/46 |
| 6,723,147 | B2 * | 4/2004 | Mashiko et al. | 55/385.1 |
| 7,252,378 | B2 * | 8/2007 | Lee | 347/87 |
| 2002/0148775 | A1 | 10/2002 | Watari et al. | 210/500.23 |

FOREIGN PATENT DOCUMENTS

| | | |
|---|---|---|
| DE | 44 34 186 | * 3/1996 |
| EP | 1243310 | 9/2002 |
| JP | 61-24458 | 2/1986 |
| JP | 10-298470 | 11/1998 |
| JP | 2000-280492 | 2/2001 |

* cited by examiner

*Primary Examiner*—Jason M Greene
(74) *Attorney, Agent, or Firm*—Fitzpatrick, Cella, Harper & Scinto

(57) ABSTRACT

The present invention provides a durable liquid housing container and a durable liquid supply apparatus which use a gas-liquid separation membrane. Thus, a gas-liquid separation membrane (2) located at an air vent in a liquid housing container (1) includes a fibril portion (2A) composed of fibrous portions and an annular node portion (2B) which bundles the ends of fibrous portions of the fibril portion (2A) and which is closed so as to surround the fibril portion (2A).

5 Claims, 7 Drawing Sheets

2A

2B

LIQUID HOUSING CONTAINER AND LIQUID SUPPLY APPARATUS

BACKGROUND OF THE INVENTION

1. Field of the Invention

The present invention relates to a liquid housing container that houses a liquid such as ink and a liquid supply apparatus.

2. Description of the Related Art

As a container that houses a liquid, a liquid housing container is conventionally known which has a gas-liquid separation membrane that passes a gas, while controlling the passage of a liquid. For example, Japanese Patent Application Laid-Open No. 61-24458 proposes an ink jet print head having an ink tank in which a gas-liquid separation membrane is installed. An opening formed in a part of the ink tank is covered with the gas-liquid separation membrane. The gas-liquid separation serves to remove bubbles from the ink tank, while preventing the leakage of ink.

By installing a membrane having such a gas-liquid separating capability in the opening in the liquid housing container, it is possible to house the liquid without leakage and to remove the gas from the liquid housing container through the membrane.

However, liquid housing containers using the conventional gas-liquid separation membrane are not sufficiently durable. For example, if an ink tank is used over a long period in which the conventional gas-liquid separation membrane is installed as disclosed in Japanese Patent Application Laid-Open No. 61-24458, ink (liquid) may soak into the gas-liquid separation membrane to reduce the air permeability of the gas-liquid separation membrane. Further, the gas-liquid separation membrane may fail to block the ink, which may leak to the outside of the ink tank. This may result in contamination or malfunction of the printing apparatus.

Such defects tend to be more marked when the surface tension of the liquid is lower. However, a lower surface tension has increasingly been requested for ink for ink jet printing apparatuses, for example.

Specifically, a problem may occur when an operation is repeated which involves making a difference in atmospheric pressure between the interior and exterior of the liquid housing container to remove the gas from the container to the exterior through the gas-liquid separation membrane. In this case, the liquid blocking capability of the gas-liquid separation membrane may be prematurely degraded. The liquid may then soak into the gas-liquid separation membrane, resulting in the leakage of the liquid. In particular, with such an ink tank as disclosed in Japanese Patent Laid-Open No. 61-24458, an operation of removing the internal gas through the gas-liquid separation membrane must often be repeated a number of times. It is thus important to ensure the repeated durability of the gas-liquid separation membrane.

Further, the gas-liquid separation membrane used for such an ink tank needs to have as high an air permeability (the amount of gas permeated per unit area) as possible in order to reduce the pressure difference or time required to remove the gas from the ink tank. Moreover, a high positive pressure may be temporarily exerted on the ink by the expansion of the ink caused by a change in temperature or the vibration or turnover of the ink tank during transportation. Accordingly, to reduce the possibility that the ink leaks to the exterior through the gas-liquid separation membrane, the gas-liquid separation membrane must have a high withstanding hydraulic pressure. The withstanding hydraulic pressure means a limiting pressure required to exert pressure on a liquid such as ink which is in tight contact with the gas-liquid separation membrane to pass the liquid through the gas-liquid separation membrane.

SUMMARY OF THE INVENTION

It is an object of the present invention to provide a durable liquid housing container using a gas-liquid separation membrane, and a liquid supply apparatus.

In the first aspect of the present invention, there is provided a liquid housing container having an opening at which a gas-liquid separation membrane allowing a gas to pass trough while limiting passage of a liquid can be located, wherein the gas-liquid separation membrane includes a fibrous area comprising fibrous portions and an annular bundling area which bundles ends of the fibrous portions and which are closed so as to surround the fibrous area.

In the second aspect of the present invention, there is provided a liquid supply apparatus having, in a liquid supply path, an opening at which a gas-liquid separation membrane allowing a gas to pass trough while limiting passage of a liquid can be located, wherein the gas-liquid separation membrane includes a fibrous area comprising fibrous portions and an annular bundling area which bundles ends of the fibrous portions and which is closed so as to surround the fibrous area.

The present invention is based on knowledge obtained from the results of the experiments and associated analyses and examinations described below.

First, a liquid housing container was produced which was provided with a common gas-liquid separation membrane at an opening to control the flow-out of a liquid, the opening being used to remove an internally remaining gas. Ink as a liquid was housed in the liquid housing container, and actual use durability tests were conducted. Then, the ink soaked into the gas-liquid separation membrane and further leaked. In particular, when a difference in atmospheric pressure was repeatedly made between the interior and exterior of the container via the gas-liquid separation membrane to repeatedly remove the gas from the container, the following occurred significantly: the soaking of the ink into the gas-liquid separation membrane and the leakage of the liquid from the gas-liquid separation membrane.

Here, the gas-liquid separation membrane has a porous structure and is composed of an area (called a "fibril") having a structure like very thin fibers and an area (called a "node") in which the ends of the fibrous portion are bundled. Since the pore size of the porous structure is far larger than the size of gas molecules, the gas-liquid separation membrane has air permeability. If a liquid comes into contact with the gas-liquid separation membrane, it permeates through the pores. Accordingly, a finite quantity of energy is required to pass the liquid through the gas-liquid separation membrane. Thus, when the liquid is subjected to at most a predetermined limiting pressure, it cannot pass through the gas-liquid separation membrane.

The present inventor closely analyzed and examined the phenomenon resulting from the repeated removal of the gas from the container. The present inventor thus found that in a part of the gas-liquid separation membrane in which the soaking or leakage of the ink occurred, the structure of the membrane was partly destroyed. The inventor further found that the destruction did not occur in the node portion of the gas-liquid separation membrane but corresponded to the rupture of the fibrous structure of the fibril portion. The fibrous structure of the fibril portion is closely related to the gas-liquid separation mechanism of the gas-liquid separation membrane. The rupture of the fibrous structure is closely related to the leakage of the liquid.

The present invention is based on such knowledge.

The present invention makes it possible to maintain the functions of the opening with the gas-liquid separation membrane over a long period to prevent for example, the leakage of the liquid, thus improving the durability of the liquid housing container and liquid supply apparatus.

The above and other objects, effects, features and advantages of the present invention will become more apparent from the followings description of embodiments thereof taken in conjunction with the accompanying drawings.

DETAILED DESCRIPTION OF THE PREFERRED EMBODIMENTS

Embodiments of the present invention will be described with reference to the drawings.

First Embodiment

FIGS. 1A to 4B are diagrams illustrating a first embodiment of the present invention. In the present embodiment, a box-shaped liquid housing container 1 was produced using a resin material.

A small window serving as an opening was formed in a top surface of the liquid housing container 1. A gas-liquid separation membrane 2 was then attached by heat seal so as to close the small window, thus forming an air vent 3. A suitable method for installing the gas-liquid separation membrane 2 is heat seal. However, of course, the present invention is not limited to this. For example, mechanical fixation (caulking) or bonding with an adhesive may be used. Moreover, the liquid housing container 1 is connected to a liquid supply system (not shown) so that ink 4 as a liquid can be freely filled into and discharged from the liquid housing container 1. The liquid supply system for example, supplies ink from an ink tank to a print head. In this case, the ink tank can be connected via an opening and closing valve to a liquid introduction port formed in the liquid housing container 1. The print head is connected via an opening and closing valve to a liquid derivation port formed in the liquid housing container 1.

The gas-liquid separation membrane 2 used in the present example was produced by uniaxially stretching a resin film containing polytetrafluoroethylene to form a membrane of a porous structure and then subjecting the surface of the membrane to a liquid repellent treatment. The liquid repellent treatment in the present example used a technique for forming a layer of a fluorine compound on the membrane surface. However, any of various common treatment methods can be appropriately used in accordance with the material of the membrane and the type of the liquid housed. Alternatively, the treatment may be omitted if it is unnecessary.

Figure 1A:
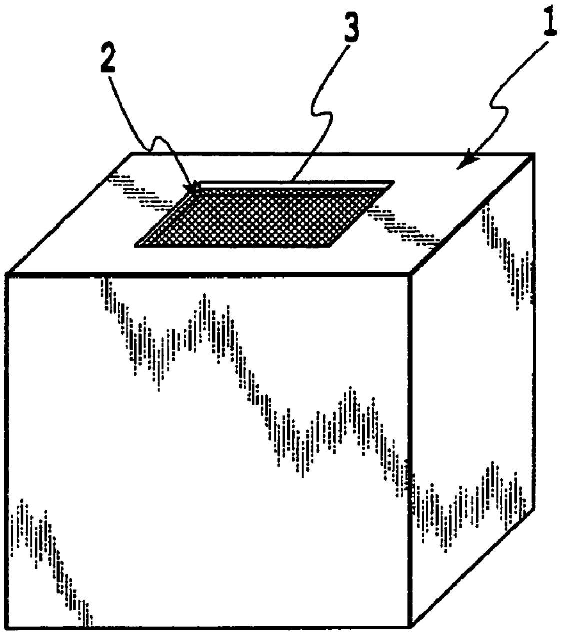
FIG. 1A is a schematic perspective view of a liquid housing container in accordance with a first embodiment of the present invention.
Figure 1B:
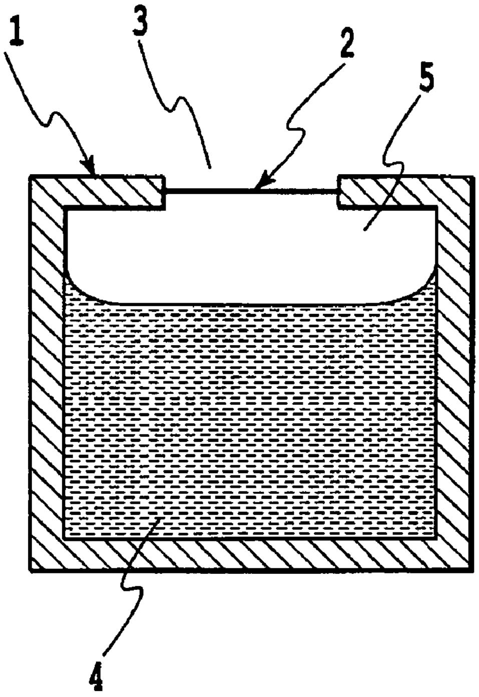
FIG. 1B is a schematic sectional view of the liquid housing container.
Figure 2:
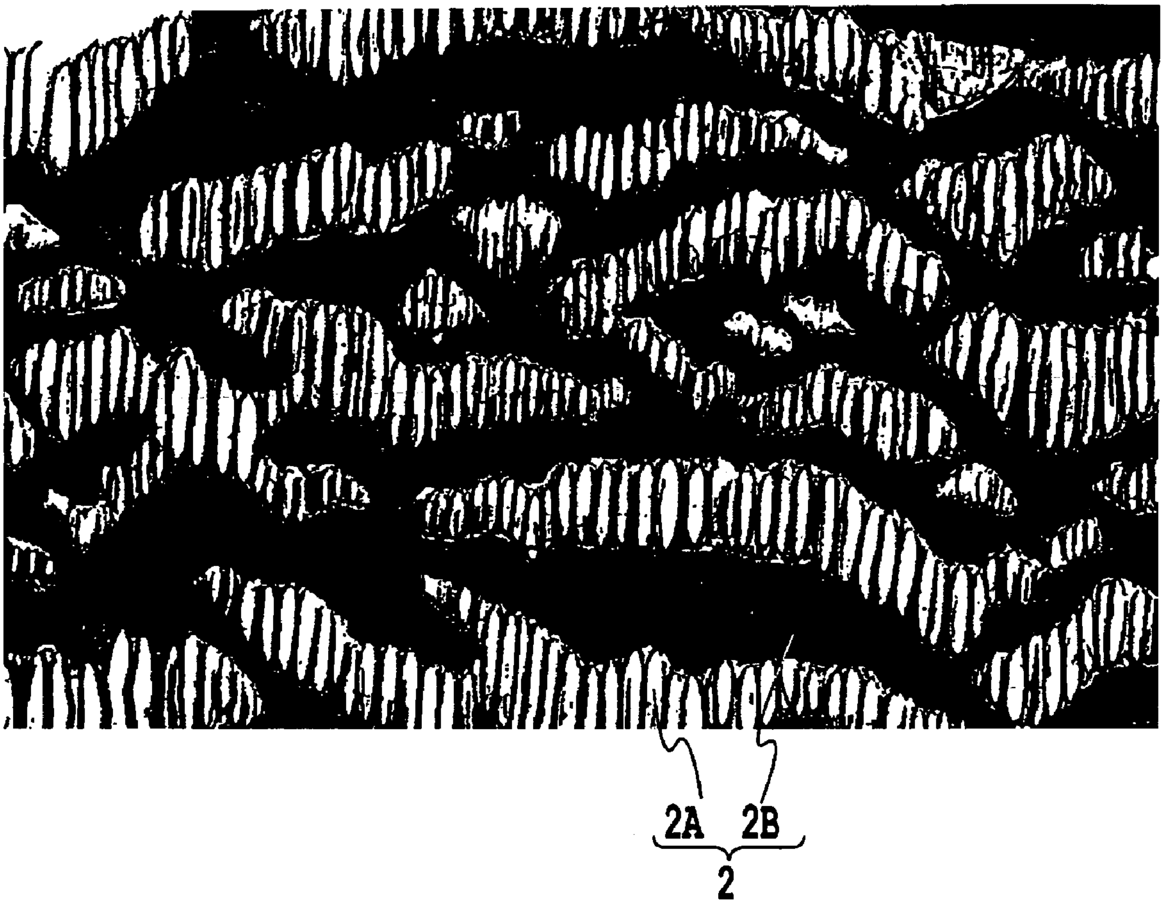
FIG. 2 is a schematic diagram of the surface structure of a gas-liquid separation membrane in FIG. 1.
Figure 3A:
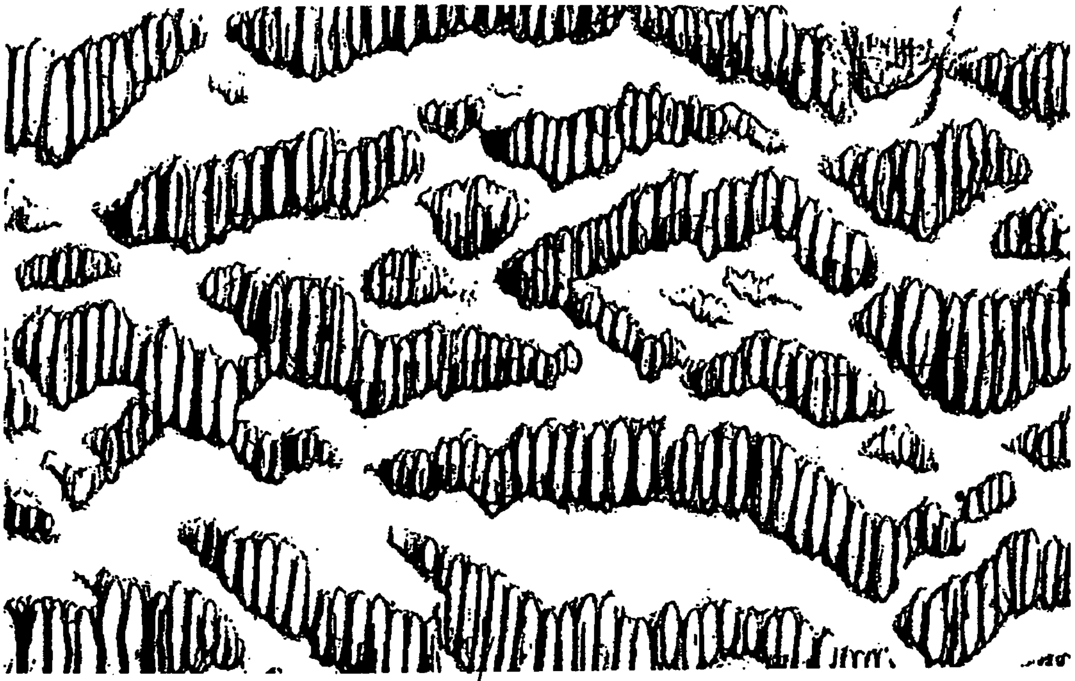
FIG. 3A is a schematic diagram showing only a fibril portion extracted from FIG. 2.
Figure 3B:
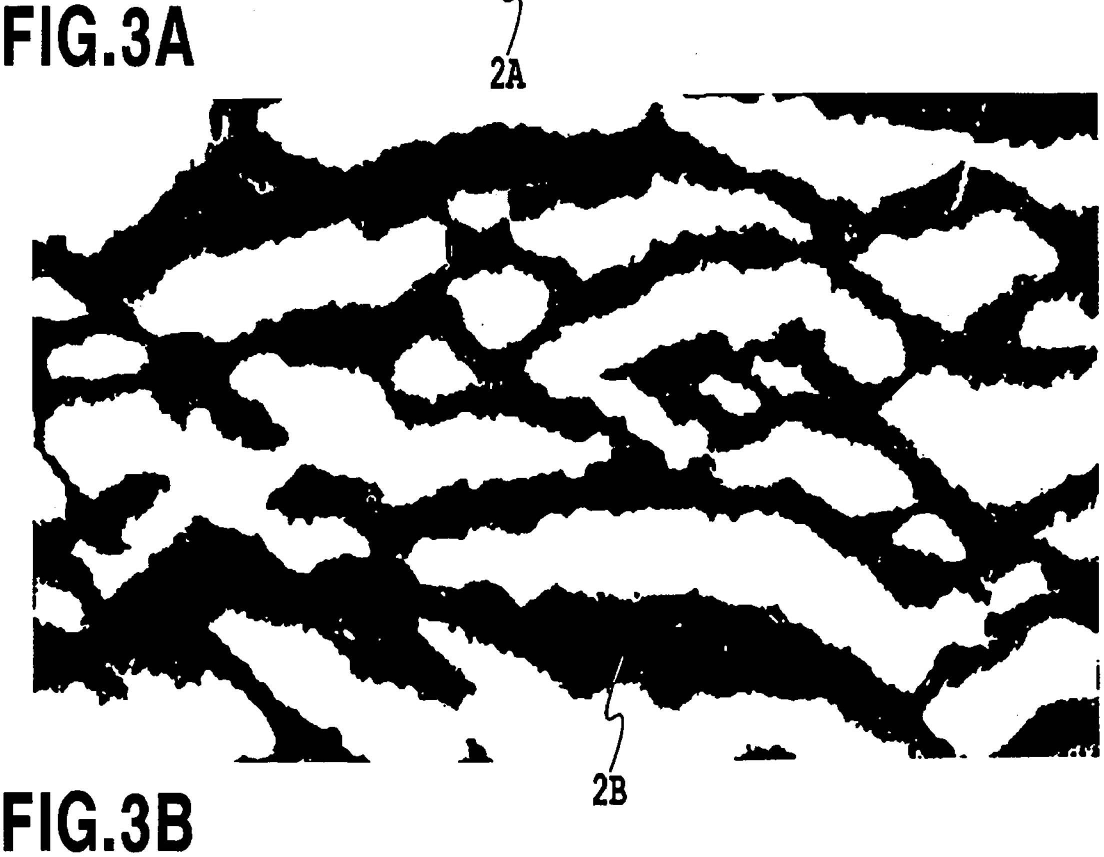
FIG. 3B is a schematic diagram showing only a node portion extracted from FIG. 2.

The surface shape of the gas-liquid separation membrane 2 consists of an area (fibril portion) 2A with a structure like very thin fibers and an area (node portion) 2B with a structure in which the ends of the fibrous portions are bundled. FIG. 2 schematically shows the surface structure of the gas-liquid separation membrane 2. FIG. 3A is a diagram showing only the fibril portion 2A extracted from the surface structure shown in FIG. 2, in order to make the structure of the gas-liquid separation membrane easily understandable. Similarly, FIG. 3B is a diagram showing only the node portion 2B extracted from the surface structure shown in FIG. 2, in order to make the structure of the gas-liquid separation membrane easily understandable.

Since the gas-liquid separation membrane 2 is formed by uniaxial stretching, the fibrous structure of the fibril portion 2A consists of fibers arranged in substantially one direction. The terminals of the fibers are bundled together to form a node portion 2B. The node portion 2B has a more characteristic surface shape, that is, it is annular and the annular structure is mostly continuous. In this case, the annular shape is not necessarily a circle but includes all the forms corresponding to a "structure closed so as to surround" the fibril portion 2A serving as a fibrous area. Besides the circle, the annular shape may be a rhomboid, an ellipse, an oval, a trapezoid, or an infinite shape. The annular shape includes all the structures closed so as to surround the fibril portion 2A serving as a fibrous area.

The node portion 2B has only to be an annular bundled area closed so as to surround the fibril portion 2A; the bundled area is obtained by bundling the ends of fibrous portions constituting the fibril portion 2A. For the node portion 2B, as is apparent from FIG. 2, the following are not particularly specified: the size or form of the fibril portion 2A surrounded by the node portion 2B, and the number of fibrous portions constituting the fibril portion 2A. Further, as is apparent from FIG. 3B, the node portion 2B is formed so that a plurality of fibrous portions surrounding different fibril portions 2A are connected together.

In such a structure, the fibrous fibril portions 2A are connected to the annular node portion 2B; this structure is similar to a frame and a gut of a tennis racket. In such a structure, the annular node portion 2B limits the force exerted on the fibrous structure of the fibril portion 2A in the direction in which the fibril portion is pulled. This reduces the magnitude of deformation of the fibril portion 2A to improve fracture strength.

Figure 4A:
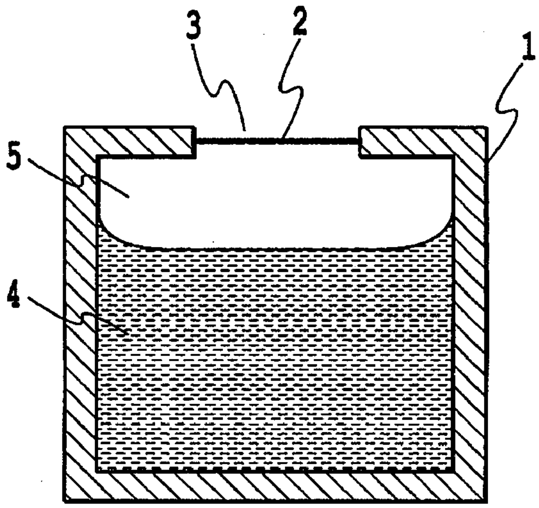
FIGS. 4A and 4B are schematic sectional views illustrating tests in which an operation of discharging a gas from the liquid housing container shown in FIG. 1B is repeated.
Figure 4B:
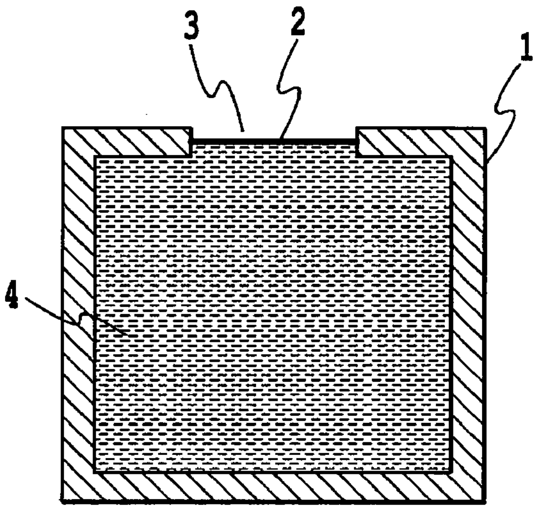

A dye-based ink 4 (surface tension =28 mN/m) as liquid was filled into the liquid housing container 1 thus produced. Then, tests were conducted in which a difference in atmospheric pressure was repeatedly made between a gas 5 in the container 1 and the exterior of the container 1 to discharge the gas 5 from the container 1 to the exterior through the gas-liquid separation membrane 2. FIGS. 4A and 4B illustrate the tests. That is, in FIG. 4A, the pressure on the gas 5 in the container 1 was set lower than the atmospheric pressure outside the container 1 to discharge the gas 5 through the gas-liquid separation membrane 2 as shown in FIG. 4B. Subsequently, an operation was repeated which involved introducing the gas 5 into the container 1 as shown in FIG. 4A and then discharging it as shown in FIG. 4B. Initially, the air permeability of the gas-liquid separation membrane 2 was 5.7 μm/(Pa·s) and the maximum difference in atmospheric pressure between the interior and exterior of the container 1 was 20 kPa. The number of times that an operation of discharging the gas 5 as shown in FIGS. 4A and 4B was repeated was 10,000.

The term "air permeability" as used in the specification refers to a value indicating the amount of gas (air) that can permeate through the membrane per unit area of the membrane within a unit time on the basis of a unit pressure difference. In particular, the definition of the air permeability in ISO-5636/5 or JIS-P8117 is commonly used. The present example conforms to this definition. The thus defined air permeability is also called ISO air permeability.

During and after the tests of such an operation as shown in FIGS. 4A and 4B, the state of the gas-liquid separation membrane 2 and a variation in the amount of gas permeated were closely observed. As a result, the following were not observed: the soaking of the liquid into the gas-liquid separation membrane 2 and the external leakage of the liquid, which occur frequently in the prior art. The amount of gas permeated did not decrease sharply. Moreover, a close analysis of surface structure of the gas-liquid separation membrane 2 did not indicate destruction of the membrane structure.

In the prior art, an increase in the withstanding hydraulic pressure of a gas-liquid separation membrane often used for the above application is considered to be essential for suppressing the soaking of the liquid into the gas-liquid separation membrane and the leakage of the liquid. However, the withstanding hydraulic pressure is contrary to the air permeability. That is, the pore size of the gas-liquid separation membrane must be reduced in order to improve the withstanding hydraulic pressure. This forces the air permeability to be sacrificed. However, the present inventor, as a result of the concentrated examinations, has confirmed that the repeated durability can be improved without the need to reduce the air permeability, that is, to increase the withstanding hydraulic pressure more than required. That is, the use of such a gas-liquid separation membrane as described above could improve the repeated durability without the need to increase the withstanding hydraulic pressure more than required, by suppressing the soaking of the liquid and the leakage of the liquid if the gas is repeatedly removed.

In the present example, the withstanding hydraulic pressure of the gas-liquid separation membrane 2 with respect to the dye ink 4 was 60 kPa. This value is sufficiently larger than that of a positive pressure that may temporarily occur inside a liquid housing container such as a common ink tank if the temperature changes or the liquid housing container is turned over under actual use conditions. Thus, during actual use, no liquid leaked from the liquid housing container 1 as a result of a change in temperature or the turn-over of the liquid housing container.

Second Embodiment

In the second embodiment, the fibers constituting the fibrous structure of the fibril portion 2A has an average thickness of 0.2 microns. The other conditions for the production of a liquid housing container 1 were similar to those in the first embodiment.

As the fibers constituting the fibrous structure of the fibril portion 2A become thicker, stress rigidity increases to make the fibrous structure unlikely to be destroyed. For example, if the fibers are cylindrical, doubling their thickness quadruples tensile rigidity. However, the extremely large thickness of the fibers reduces the pore size of the gas-liquid separation membrane to preclude sufficient air permeability from being achieved.

As a result of examinations, the present inventor has found that with the gas-liquid separation membrane 2 with the above structure, a sufficient fracture strength is achieved when the fibers constituting the fibrous structure of the fibril portion 2A have an average thickness of at least 0.1 micron. The term "average thickness of the fibers" as used in the specification refers to the average value of diameter of the thinnest part of each fiber constituting the fibril portion 2A. The average thickness can be actually measured using an electron microscopic image of the gas-liquid separation membrane 2. Of course, the number of samples used to calculate the average value should be larger. For example, if at least 100 fibers are used for the calculation, the average value can be obtained with a statistically sufficiently reliable accuracy. In the present example, the average thickness of the fibers in the fibril portion 2A was calculated by actually measuring the diameter of the thinnest part of each of the (about 300) fibers in a 100×100 μm area on the basis of an electron microscopic image of the area.

A liquid was filled into the liquid housing container 1 in accordance with the present embodiment and tests were conducted in which an operation of discharging the gas 5 was repeated as in the first embodiment. The test conditions were similar to those in the first embodiment. As a result, even after the repeated tests, the occurrence of the following was prevented: the soaking of the liquid into the gas-liquid separation membrane 2 and the external leakage of the liquid from the gas-liquid separation membrane 2. Moreover, the following were not observed: a decrease in the amount of gas permeated through the gas-liquid separation membrane 2 and the destruction of the membrane structure.

Third Embodiment

In the present embodiment, an opening 3 was formed at the top of the liquid housing container 1 (see FIGS. 1A and 1B); the opening was a rectangle having a 3×7 mm cross section in which the gas was permeated. The gas-liquid separation membrane was installed at the opening 3 to form an air vent 3. In this case, the minor axis (the direction of the length of 3 mm) of the opening 3 was placed parallel to the direction in which the fibers constituting the fibrous area of the gas-liquid separation membrane are substantially arranged.

As a result of examinations, the present inventor has found that the above configuration specifically exerts good effects on our objects. As described above, the strength of the gas-liquid separation membrane affects the leakage of the fluid resulting from the rupture of the fibrous portion of the gas-liquid separation membrane. That is, the expansion force exerted on the fibers must be minimized in order to prevent the rupture. To achieve this, it is effective to suppress the deformation of the entire membrane.

However, when for example, the size of an opening is reduced which is formed in the container to suppress the deformation of the entire membrane, disadvantageously the air permeation area and thus the total air permeability decrease.

As a result of examinations, the present inventor observed anisotropy in the membrane strength, in other words, in the unlikelihood of deformation under an external force, in the gas-liquid separation membrane in which the fibers constituting the fibrous area are arranged in substantially one direction. That is, the gas-liquid separation membrane is soft in a direction perpendicular to the direction in which the fibers are arranged but has a very high membrane strength in a parallel direction.

Thus, in view of this, examinations were made of methods of suppressing the leakage of the liquid during the repeated removal of the gas without reducing the area, to obtain the configuration described below. That is, the present inventor has found that a liquid housing container having an extremely durable gas-liquid separation membrane is obtained by shaping the opening 3 so that it has a major axis and a minor axis (rectangle) and setting the minor axis of the rectangle parallel to the direction in which the gas-liquid separation membrane is strong, that is, the direction in which the fibers are arranged.

In this case, the opening 3 is rectangular. However, of course, similar effects are exerted when a cross section of the opening which is perpendicular to the air permeation direction is shaped to have a minor axis and a major axis and when the minor axis of the opening cross section is parallel to the direction in which the fibers constituting the fibrous area of the gas-liquid separation membrane are substantially arranged. The term "shape having a minor axis and a major axis" as used in the specification refers to all the figures that have only at most two line symmetrical axes and thus have nonuniform distances from the center of the figure, thus enabling a minor axis and a major axis to be defined. Typical shapes include a rectangle, an ellipse, an oval, a rhomboid, a parallelogram, and a trapezoid. It is needless to say that the shape includes figures obtained by slightly rounding or chamfering corners of the above figures.

The present embodiment is effective particularly in a fourth and fifth embodiments described later.

Fourth Embodiment

Figure 5:
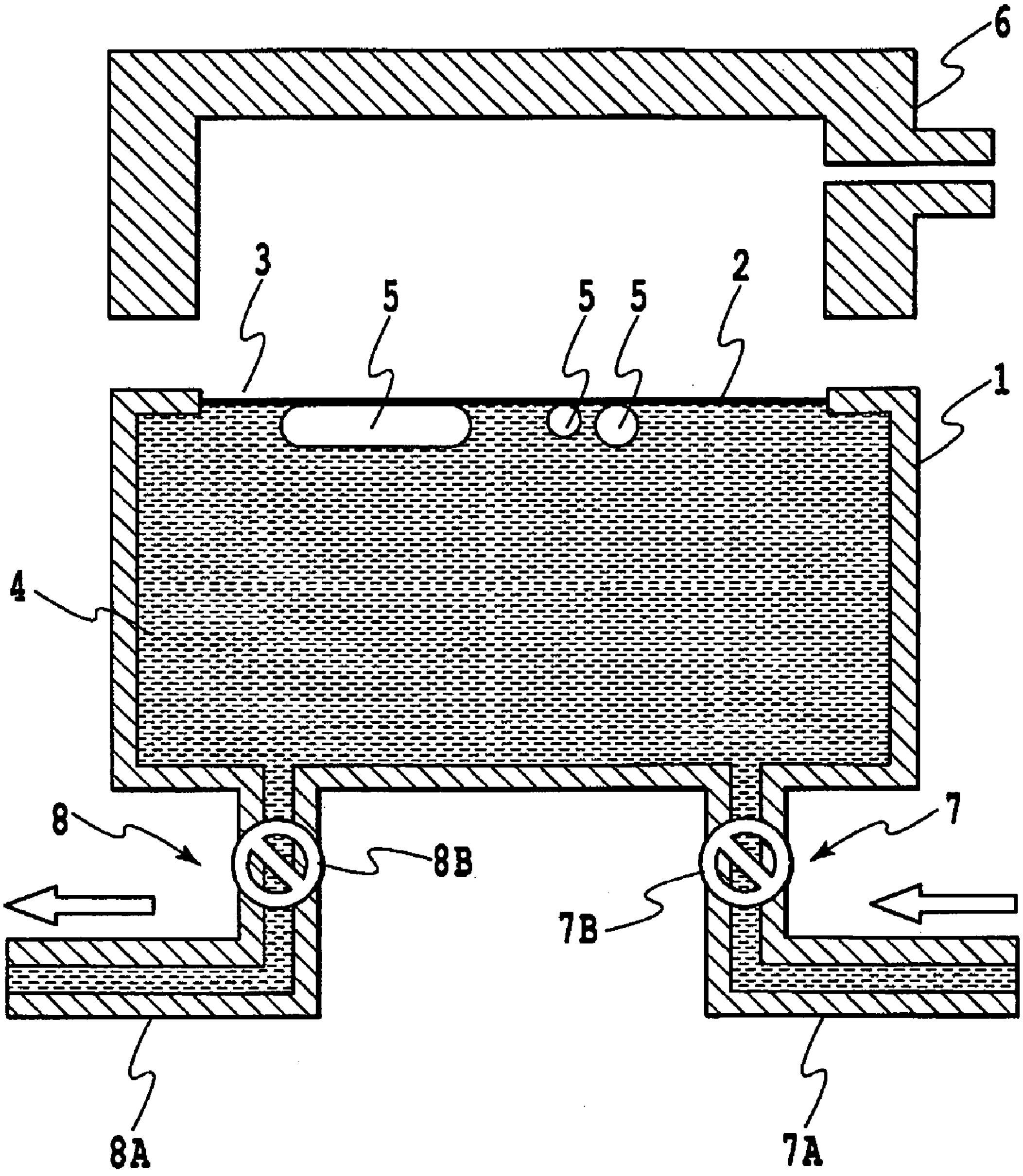
FIG. 5 is a schematic sectional view of a liquid housing container in accordance with a second embodiment of the present invention.
Figure 6:
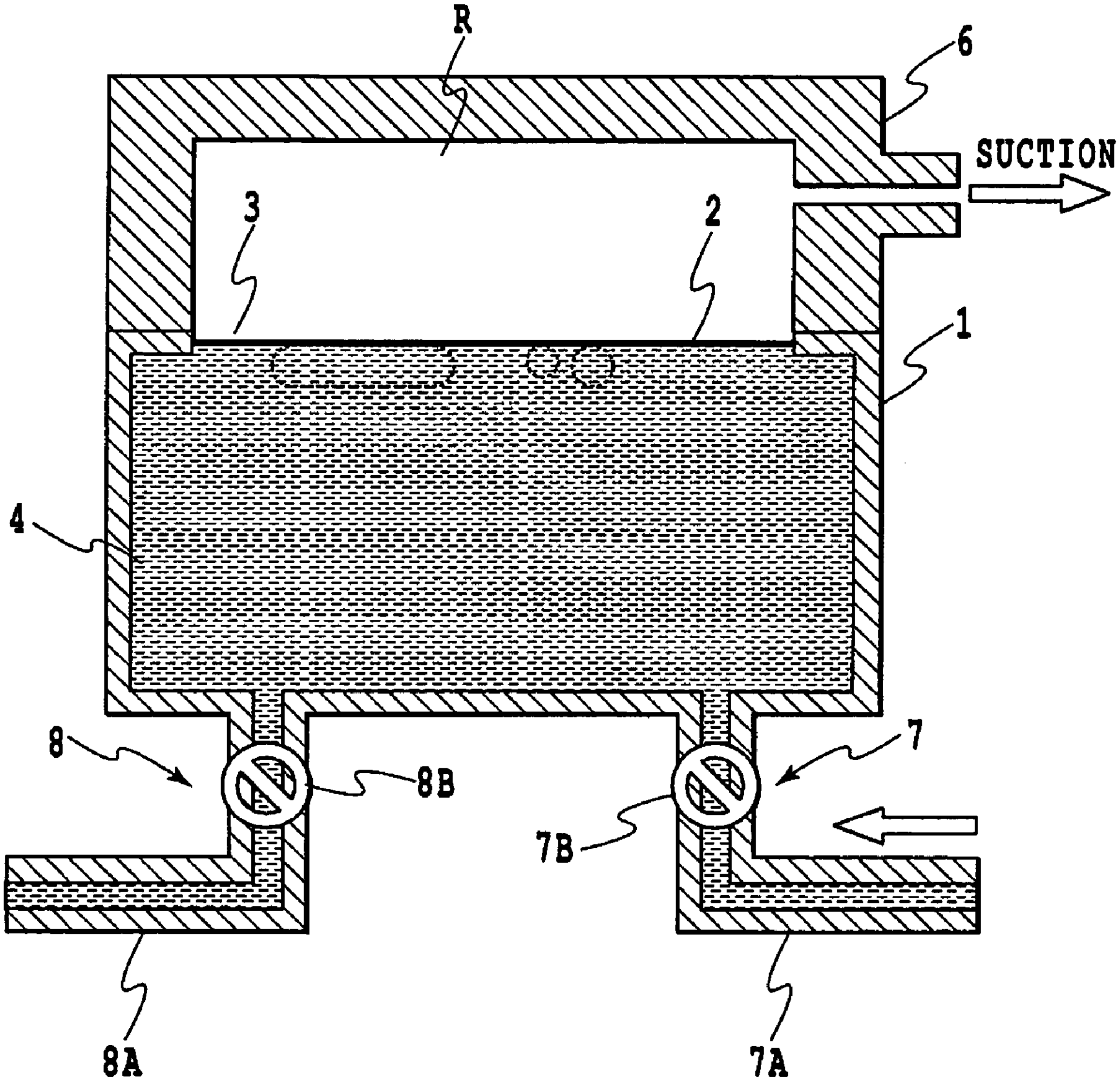
FIG. 6 is a schematic sectional view of an operation of discharging a gas from the liquid housing container shown in FIG. 5.

FIGS. 5 and 6 are diagrams illustrating a fourth embodiment of the present invention. In the present embodiment, the liquid housing container produced in the above second embodiment was used as an ink housing container (ink tank) 1 to produce an ink injecting apparatus that injects ink housed in the ink housing container.

The ink housing container 1 in the present apparatus is configured as shown in FIGS. 5 and 6. The gas-liquid separation membrane 2 is provided at a position where the gas 5 present in the ink housing container 1 can be discharged by utilizing the difference in pressure between the interior and exterior of the ink housing container 1. That is, the air vent 3 having the gas-liquid separation membrane 2 is formed in the top surface of the ink housing container 1. A cap 6 is provided for the air vent 3 so that it can contact and leave the air vent 3. The cap 3 covers such an air vent 3 as shown in FIG. 6, to form a pressure-controllable airtight chamber R (see FIG. 6) above the gas-liquid separation membrane 2. The cap 6 is connected to a negative pressure generating means such as a negative pressure pump through an opening and closing valve (not shown) that can be opened and closed. By introducing a negative pressure into the airtight chamber R formed as shown in FIG. 6, it is possible to make a difference in pressure between the interior and exterior of the ink housing container 1 via the gas-liquid separation membrane 2.

Lines 7A and 8A are connected to the bottom of the ink housing container 1 so as to constitute an ink introducing system 7 and an ink guide-out system 8. The lines 7A and 8A are provided with valves 7B and 8B, respectively, which can control the flow of the ink. The line 7A is connected to an ink refilling section (not shown) that refills ink into the interior of the ink housing container 1. The line 8A is connected to an ink ejecting section (not shown) that ejects the ink housed in the ink housing container 1. The ink ejecting section is for example, an ink jet print head. With the ink jet print head, ink fed from the interior of the ink housing container 1 can be ejected onto a printed medium through a nozzle to print an image on the printed medium.

If such an ink housing container 1 is used, ink is filled into the ink housing container 1 through the line 7A of the ink introduction system 7. In this case, the cap 6 is separated upward from the air vent 3 as shown in FIG. 5. Further, the valve 8A in the ink introduction system 8 is opened to make the line 8A available.

After the ink housing container 1 is filled with the ink, the valves 7B and 8B are closed. Further, the cap 6 is used to close the air vent 6 to form the airtight chamber R as shown in FIG. 6. Then, a negative pressure is introduced into the airtight chamber R to reduce the pressure in the chamber R. This reduces the pressure in the ink housing container 1 via the gas-liquid separation membrane 2. The gas 5 mixed and remaining inside the ink housing container 1 is discharged from the airtight chamber R to the exterior of the ink housing container 1 through the gas-liquid separation membrane 2 as shown in FIG. 6.

After the gas 5 is thus discharged from the interior of the ink housing container 1, the cap 6 is separated from the air vent 3. Then, by appropriately controllably opening and closing the valves 7B and 8B, it is possible to supply the ink from the ink housing container 1 to the ink ejecting section through the ink guide-out system 8, while refilling the ink from the ink refilling section into the interior of the ink housing container 1 through the ink introduction system 7. The gas 5 is discharged from the ink housing container 1 through the gas-liquid separation membrane 2 so as to inhibit the gas 5 from remaining the ink housing container 1. This makes it possible to avoid the introduction of the gas 5 into the ink ejecting section. If for example, the ink ejecting section is an ink jet print head, when bubbles enter the ink jet print head, the energy required to eject the ink through the nozzle may be absorbed by a change in the volume of the bubbles. In some cases, a change in temperature may increase or reduce the volume of the bubbles to make the ejection of the ink through the nozzle unstable. Such a problem can be avoided by inhibiting the gas 5 from remaining in the ink housing container 1.

The gas 5 from the ink introduction system 7 may enter the ink housing container 1 together with the ink. Thus, an operation of discharging the gas 5 through the gas-liquid separation membrane 2 is repeated periodically or at appropriate times. During the discharging operation, as previously described, the valves 7B and 8B are closed and the cap 6 is used to form the airtight chamber R so that a negative pressure can be introduced into the airtight chamber R as shown in FIG. 6. Further, the valve 7B in the ink introduction system 7 may be a normally open valve that is automatically closed when the pressure in the ink housing container 1 reaches at most a predetermined value, in order to discharge the gas 5 from the ink housing container 1. Alternatively, as shown in FIG. 6, the cap 6 may be used to always form the airtight chamber R. Then, a negative pressure may be introduced into the airtight chamber R to discharge the gas 5 from the ink housing container 1, and the airtight chamber R may otherwise be open to the air.

In the present embodiment, the operation of discharging the gas 5 was repeated in association with an operation of refilling and supplying the ink as described above. The difference in atmospheric pressure between the interior and exterior of the ink housing container 1 was 20 kPa. The number of times that the operation of discharging the gas 5 was 10,000. As a result, the soaking of the ink into the gas-liquid separation membrane 2 and the leakage of the ink did not occur. The repeated durability could be improved.

Fifth Embodiment

Figure 7:
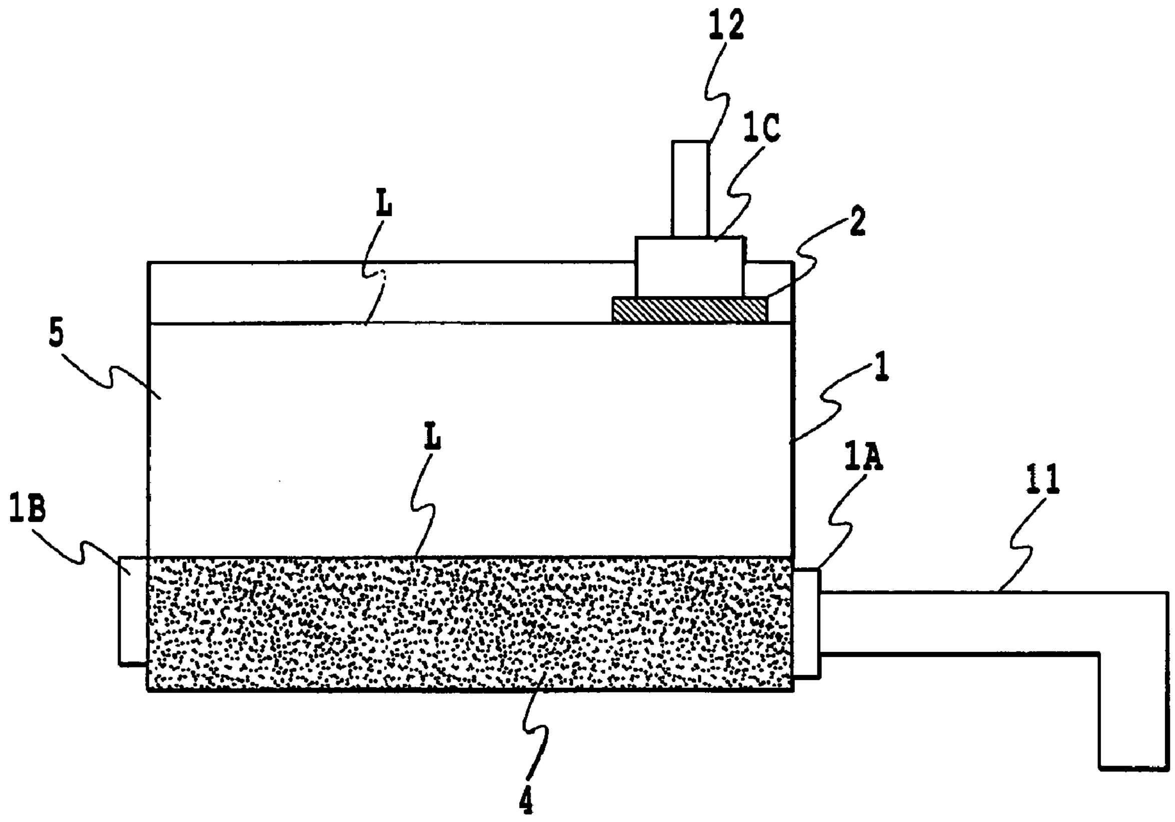
FIG. 7 is a schematic diagram of the liquid housing container in accordance with the second embodiment of the present invention.

FIG. 7 is a diagram illustrating a fifth embodiment of the present invention. The ink housing container 1 in accordance with the present embodiment uses the gas-liquid separation membrane 2 to supply the ink 4 to the interior of the container 1.

The ink housing container 1 is provided with an ink refilling port 1A, an ink supply port 1B, and a suction port 1C. The ink refilling port 1A is connected to a supply path 11 for the ink 4. The ink supply port 1B is connected to an ink supply path (not shown) through which the ink 4 is supplied to an ink jet print head or the like. The suction port 1C is connected to a negative pressure supply path 12 such as a negative pressure pump. The suction port 1C comprises the gas-liquid separation membrane 2, through which a negative pressure is introduced into the ink housing container 1.

When the level L of the ink 4 in the ink housing container 1 lowers as shown by the solid line in FIG. 7, so that the ink 4 must be refilled into the ink housing container 1, the ink supply path connected to the ink supply port 1B is first closed. Then, a negative pressure is introduced into the ink housing container 1 through the gas-liquid separation membrane 2 using the suction port 1C. The negative pressure serves to suck and refill the ink from the ink refilling path 11 into the ink housing container 1 through the ink refilling port 1A. As the ink is sucked and refilled, the level L rises gradually. Then, when the level L rises to the position shown by an alternate long and two short dashes line in FIG. 7 and the ink 4 contacts the gas-liquid separation membrane 2, the suction and refilling of the ink 4 is automatically stopped. That is, since the gas-liquid separation membrane 2 allows the gas 5 from the ink housing container 1 to pass through, while inhibiting the passage of the ink 4, the suction and refilling of the ink 4 is automatically stopped when the level L reaches the position of the gas-liquid separation membrane 2.

In this manner, the gas-liquid separation membrane 2 can be used to refill a predetermined amount of ink 4 into the ink housing container 1.

The present embodiment shows the configuration in which the ink is filled simultaneously with removal of the gas by reducing the pressure in the ink housing container from outside the ink housing container to make a difference in pressure between the interior and exterior of the ink housing container. However, the ink may be filled simultaneously with removal of the gas by exerting pressure on the interior of the ink housing container to make a difference in pressure between the interior and exterior of the ink housing container.

Other Embodiments

The liquid housing container is widely applicable as a container that accommodates not only ink but also any of various liquids.

Further, the present invention can discharge the gas from the interior to exterior of the liquid housing container via the gas-liquid separation membrane by making a difference in pressure between the interior and exterior of the liquid housing container (the pressure is low inside the container and high outside the container). The opening in the liquid housing container at which the gas-liquid separation membrane can be installed may be the air vent that allows the gas to be discharged from the liquid housing container through the gas-liquid separation membrane as in the case of the above first to third embodiments. The opening may be the suction port that allows a negative pressure required to suck the liquid to be introduced through the gas-liquid separation membrane as in the case of the fourth embodiment. Alternatively, the opening may allow the atmospheric pressure to act on the interior of the liquid housing container through the gas-liquid separation membrane.

The present invention is also applicable to a liquid supply apparatus comprising components which are similar to those of the above liquid housing container and which are arranged in a liquid supply path, and to a liquid supply apparatus comprising the above opening in a liquid supply path. The liquid supply path is used to supply a liquid from a liquid refilling section to a section such as a liquid housing container or an ink jet print head which uses the liquid. If such an opening as described above is formed in such a liquid supply path, an arrangement can be provided which positively makes a difference in pressure between the inside and outside of the gas-liquid separation membrane disposed at the opening as described above.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No. 2004-381750 filed Dec. 28, 2004, which is hereby incorporated by reference herein.

What is claimed is:

1. A liquid housing container having an interior for containing a liquid to be ejected from an ink-jet print head, an opening communicating between the interior and an exterior being outside the interior, and a gas-liquid separation membrane located at the opening, and the gas-liquid separation membrane allowing a gas to pass through while limiting passage of a liquid, the liquid housing container being constructed to discharge the gas in the interior to the exterior by making a difference in pressure between the interior and exterior, wherein the gas-liquid separation membrane is a resin film including a fibrous area comprising fibrous portions and an annular bundling area which bundles ends of the fibrous portions and which is closed so as to surround the fibrous area, wherein the fibrous portions are arranged in substantially one direction, and wherein the opening has a cross section comprising a minor axis and a major axis, and wherein a direction in which fibers in the gas-liquid separation membrane located at the opening is substantially parallel to a direction of the minor axis of the opening.

2. The liquid housing container according to claim 1, wherein the fibrous portions have an average thickness of at least 0.1 micron.

3. The liquid housing container according to claim 1, wherein a material for the gas-liquid separation membrane contain polytetrafluoroethylene.

4. The liquid housing container according to claim 1, wherein the liquid housing container constitutes an ink tank in which liquid ink is housed.

5. A liquid supply apparatus having, in a liquid supply path to be connected to an ink-jet print head, an opening at which a gas-liquid separation membrane allowing a gas to pass trough while limiting passage of a liquid can be located, wherein the gas-liquid separation membrane is a resin film including a fibrous area comprising fibrous portions and an annular bundling area which bundles ends of the fibrous portions and which is closed so as to surround the fibrous area, wherein the fibrous portions are arranged in substantially one direction, and wherein the opening has a cross section comprising a minor axis and a major axis, and wherein a direction in which fibers in the gas-liquid separation membrane located at the opening is substantially parallel to a direction of the minor axis of the opening.

* * * * *